US012561557B2

(12) United States Patent
Pham et al.

(10) Patent No.: US 12,561,557 B2
(45) Date of Patent: Feb. 24, 2026

(54) META PSEUDO-LABELS

(71) Applicant: Google LLC, Mountain View, CA (US)

(72) Inventors: Hieu Hy Pham, Redwood City, CA (US); Zihang Dai, Pittsburgh, PA (US); Qizhe Xie, Pittsburgh, PA (US); Quoc V. Le, Sunnyvale, CA (US)

(73) Assignee: Google LLC, Mountain View, CA (US)

( * ) Notice: Subject to any disclaimer, the term of this patent is extended or adjusted under 35 U.S.C. 154(b) by 1107 days.

(21) Appl. No.: 17/551,065

(22) Filed: Dec. 14, 2021

(65) Prior Publication Data

US 2022/0188636 A1     Jun. 16, 2022

Related U.S. Application Data

(60) Provisional application No. 63/125,363, filed on Dec. 14, 2020.

(51) Int. Cl.
*G06N 3/08*          (2023.01)
*G06F 18/21*         (2023.01)
*G06F 18/214*        (2023.01)
*G06N 3/045*         (2023.01)

(52) U.S. Cl.
CPC .......... *G06N 3/08* (2013.01); *G06F 18/2155* (2023.01); *G06F 18/217* (2023.01); *G06N 3/045* (2023.01)

(58) Field of Classification Search
CPC ........ G06N 3/08; G06N 3/045; G06N 3/0464; G06N 3/084; G06N 3/088; G06N 3/0895; G06N 3/09; G06N 3/0985; G06F 18/2155; G06F 18/217; G06V 10/82; G06V 10/774
See application file for complete search history.

(56) References Cited

U.S. PATENT DOCUMENTS

| | | | | |
|---|---|---|---|---|
| 2016/0078339 A1* | 3/2016 | Li | ........................... | G06N 3/082 |
| | | | | 706/20 |
| 2019/0205748 A1* | 7/2019 | Fukuda | ................ | G06N 3/0464 |
| 2020/0134427 A1* | 4/2020 | Oh | ........................ | G06N 3/0464 |

OTHER PUBLICATIONS

Asit Mishra et al, "Apprentice: Using Knowledge Distillation Techniques to Improve Low-Precision Network Accuracy", Nov. 15, 2017, arXiv:1711.05852v1 (Year: 2017).*
Qizhe Xie et al., "Self-training with Noisy Student improves ImageNet classification", Nov. 11, 2019, arXiv:1911.04252v1 (Year: 2019).*
Geoffrey Hinton et al., "Distilling the Knowledge in a Neural Network", Mar. 9, 2015, arxiv:1503.02531v1 (Year: 2015).*
Aakash Nain, "Self-training with Noisy Student", Nov. 16, 2019, https://medium.com/@nainaakash012/self-training-with-noisy-student-f33640edbab2#:~:text=Annotating%20data%20is%20mundane.,called%20it%20a%20noisy%20student. (Year: 2019).*
Khaled Boudaoud, "The motivation behind Residual Neural Networks", Nov. 5, 2019, https://medium.com/analytics-vidhya/introduction-to-residual-neural-networks-8af5b7c4afd4 (Year: 2019).*

(Continued)

*Primary Examiner* — Omar F Fernandez Rivas
(74) *Attorney, Agent, or Firm* — Fish & Richardson P.C.

(57) ABSTRACT

Methods, systems, and apparatus, including computer programs encoded on computer storage media, for training a neural network using meta pseudo-labels. One of the methods includes training a student neural network using pseudo-labels generated by a teacher neural network that is being trained jointly with the student neural network.

20 Claims, 4 Drawing Sheets

(56) References Cited

OTHER PUBLICATIONS

Lin Wang et al., "Knowledge Distillation and Student-Teacher Learning for Visual Intelligence: A Review and New Outlooks", Apr. 13, 2020, arXiv:2004.05937v1 (Year: 2020).*
Abadi et al., "TensorFlow: A System for Large-Scale Machine Learning," Presented at 12th USENIX Symposium on Operating Systems Design and Implementation (OSDI '16), Savannah, GA, USA, Nov. 2-4, 2016, pp. 265-283.
Arazo et al., "Pseudo-Labeling and Confirmation Bias in Deep Semi-Supervised Learning," arXiv, Sep. 25, 2019, 12 pages.
Baydin et al., "Online Learning Rate Adaptation with Hypergradient Descent," Presented at Sixth International Conference on Learning Representations, Vancouver, Canada, April 30-May 3, 2018, 11 pages.
Berthelot et al., "MixMatch: A Holistic Approach to Semi-Supervised Learning," Advances in Neural Information Processing Systems, 2019, 11 pages.
Berthelot et al., "ReMixMatch: Semi-supervised learning with distribution alignment and augmentation anchoring," arXiv, Feb. 13, 2020, 13 pages.
Beyer et al., "Are we done with ImageNet?", arXiv, Jun. 12, 2020, 15 pages.
Chapelle et al., "Semi-Supervised Learning," The MIT press, 2010, 524 pages.
Chen et al., "A Simple Framework for Contrastive Learning of Visual Representations," Proceedings of the 37th International Conference on Machine Learning, 2020, 11 pages.
Chen et al., "Big Self-Supervised Models are Strong Semi-Supervised Learners," Advances in Neural Information Processing Systems, 2020, 13 pages.
Chen et al., "Improved Baselines with Momentum Contrastive Learning," arXiv, Mar. 9, 2020, 3 pages.
Chollet et al. "Xception: Deep Learning With Depthwise Separable Convolutions," Proceedings of the IEEE Conference on Computer Vision and Pattern Recognition, Jul. 2017, pp. 1251-1258.
Cubuk et al., "AutoAugment: Learning Augmentation Strategies From Data," Proceedings of the IEEE/CVF Conference on Computer Vision and Pattern Recognition, Jun. 2019, pp. 113-123.
Cubuk et al., "RandAugment: Practical Automated Data Augmentation with a Reduced Search Space," Advances in Neural Information Processing Systems, 2020, 12 pages.
Dosovitskiy et al., "An Image is Worth 16×16 Words: Transformers for Image Recognition at Scale," arXiv, Oct. 22, 2020, 21 pages.
Finn et al., "Model-Agnostic Meta-Learning for Fast Adaptation of Deep Networks," Proceedings of the 34th International Conference on Machine Learning, 2017, 10 pages.
Furlanello et al., "Born Again Neural Networks," Proceedings of the 35th International Conference on Machine Learning, 2018, 10 pages.
Ghiasi et al., "DropBlock: A regularization method for convolutional networks," Advances in Neural Information Processing Systems, 2018, 11 pages.
Gidaris et al., "Unsupervised representation learning by predicting image rotations," arXiv, Mar. 21, 2018, 6 pages.
Grandvalet et al., "Semi-supervised Learning by Entropy Minimization," Advances in Neural Information Processing Systems, 2004, 8 pages.
Grill et al., "Bootstrap Your Own Latent—A New Approach to Self-Supervised Learning," Advances in Neural Information Processing Systems, 2020, 14 pages.
He et al., "Deep Residual Learning for Image Recognition," Proceedings of the IEEE Conference on Computer Vision and Pattern Recognition, Jun. 2016, pp. 770-778.
He et al., "Momentum Contrast for Unsupervised Visual Representation Learning," Proceedings of the IEEE/CVF Conference on Computer Vision and Pattern Recognition, Jun. 2020, pp. 9729-9738.
He et al., "Revisiting Self-Training for Neural Sequence Generation," Presented at Eighth International Conference on Learning Representations, virtual conference, Apr. 26-May 1, 2020, 15 pages.
Henaff et al., "Data-Efficient Image Recognition with Contrastive Predictive Coding," arXiv, Jul. 1, 2020, 13 pages.
Hinton et al., "Distilling the Knowledge in a Neural Network," arXiv, Mar. 9, 2015, 9 pages.
Hu et al., "Squeeze- and-Excitation Networks," Proceedings of the IEEE Conference on Computer Vision and Pattern Recognition, Jun. 2018, pp. 7132-7141.
Huang et al., "Densely Connected Convolutional Networks," Proceedings of the IEEE Conference on Computer Vision and Pattern Recognition, Jul. 2017, pp. 4700-4708.
Huang et al., "GPipe: Efficient Training of Giant Neural Networks using Pipeline Parallelism," Advances in Neural Information Processing Systems, 2019, 10 pages.
Jackson et al., "Semi-Supervised Learning by Label Gradient Alignment," arXiv, Feb. 6, 2019, 12 pages.
Kahn et al., "Self-Training for End-to-End Speech Recognition," Presented at IEEE International Conference on Acoustics, Speech and Signal Processing, Barcelona, Spain, May 4-8, 2020, pp. 7084-7088.
Ke et al., "Dual Student: Breaking the Limits of the Teacher in Semi-Supervised Learning," Proceedings of the IEEE/CVF International Conference on Computer Vision, Oct. 2019, pp. 6728-6736.
Kolesnikov et al., "Big Transfer (BiT): General Visual Representation Learning," Proceedings of the European Conference on Computer Vision, 2020, 10 pages.
Krizhevsky, "Learning multiple layers of features from tiny images," Apr. 8, 2009, 60 pages.
Laine et al., "Temporal ensembling for semi-supervised learning," Presented at 5th International Conference on Learning Representations, Toulon, France, Apr. 24-26, 2017, 13 pages.
Lee et al., "Pseudo-Label: The simple and efficient semi-supervised learning method for deep neural networks," Presented at International Conference on Machine Learning, Atlanta, Georgia, Jun. 16-21, 2013, 6 pages.
Lepikhin et al., "GShard: Scaling Giant Models with Conditional Computation and Automatic Sharding," arXiv, Jun. 30, 2020, 35 pages.
Li et al., "Prototypical Contrastive Learning of Unsupervised Representations," arXiv, Jul. 28, 2020, 16 pages.
Liu et al., "DARTS: Differentiable Architecture Search," Presented at Seventh International Conference on Learning Representations, New Orleans, LA, USA, May 6-9, 2019, 13 pages.
Liu et al., "Progressive neural architecture search," Proceedings of the European Conference on Computer Vision, Sep. 2018, 16 pages.
Loshchilov et al., "SGDR: Stochastic Gradient Descent with Warm Restarts," Presented at 5th International Conference on Learning Representations, Toulon, France, Apr. 24-26, 2017, 16 pages.
Mahajan et al., "Exploring the Limits of Weakly Supervised Pretraining," Proceedings of the European Conference on Computer Vision, Sep. 2018, pp. 181-196.
Miller et al., "When does label smoothing help?," Advances in Neural Information Processing Systems, 2019, 10 pages.
Misra et al., "Self-Supervised Learning of Pretext-Invariant Representations," Proceedings of the IEEE/CVF Conference on Computer Vision and Pattern Recognition, Jun. 2020, pp. 6707-6717.
Miyato et al., "Virtual Adversarial Training: A Regularization Method for Supervised and Semi-Supervised Learning," IEEE Transactions on Pattern Analysis and Machine Intelligence, Jul. 23, 2018, 14 pages.
Netzer et al., "Reading Digits in Natural Images with Unsupervised Feature Learning," Advances in Neural Information Processing Systems Workshop on Deep Learning and Unsupervised Feature Learning, 2011, 9 pages.
Noroozi et al., "Unsupervised Learning of Visual Representations by Solving Jigsaw Puzzles," arXiv, Jun. 26, 2016, 18 pages.
Oliver et al., "Realistic Evaluation of Deep Semi-Supervised Learning Algorithms," Advances in Neural Information Processing Systems, 2018.
Park et al., "Improved noisy student training for automatic speech recognition," Interspeech, 2020, 5 pages.

(56)        References Cited

OTHER PUBLICATIONS

Pathak et al., "Context Encoders: Feature Learning by Inpainting," Proceedings of the IEEE Conference on Computer Vision and Pattern Recognition, Jun. 2016, pp. 2536-2544.

Radosavovic et al., "Data Distillation: Towards Omni-Supervised Learning," Proceedings of the IEEE Conference on Computer Vision and Pattern Recognition, Jun. 2018, pp. 4119-4128.

Real et al., "Regularized Evolution for Image Classifier Architecture Search," AAAI Technical Track: Machine Learning, Jul. 17, 2019, pp. 4780-4789.

Ren et al., "Learning to Reweight Examples for Robust Deep Learning," Proceedings of the 35th International Conference on Machine Learning, 2018, 10 pages.

Ren et al., "Not All Unlabeled Data are Equal: Learning to Weight Data in Semi-supervised Learning," Advances in Neural Information Processing Systems, 2020, 12 pages.

Riloff et al., "Automatically generating extraction patterns from untagged text," Proceedings of the national conference on artificial intelligence, 1996, pp. 1044-1049.

Russakovsky et al., "ImageNet Large Scale Visual Recognition Challenge," International Journal of Computer Vision, Apr. 11, 2015, pp. 211-252.

Scudder, "Probability of error of some adaptive pattern-recognition machines," IEEE Transactions on Information Theory, Jul. 1965, pp. 363-371.

Sohn et al., "FixMatch: Simplifying Semi-Supervised Learning with Consistency and Confidence," Advances in Neural Information Processing Systems, 2020, 13 pages.

Such et al., "Generative Teaching Networks: Accelerating Neural Architecture Search by Learning to Generate Synthetic Training Data," Proceedings of the 37th International Conference on Machine Learning, 2020, 11 pages.

Sun et al., "Revisiting Unreasonable Effectiveness of Data in Deep Learning Era," Proceedings of the IEEE International Conference on Computer Vision, Oct. 2017, pp. 843-852.

Szegedy et al., "Inception-v4, Inception-ResNet and the Impact of Residual Connections on Learning," Proceedings of the Thirty-First AAAI Conference on Artificial Intelligence, 2017, pp. 4278-4284.

Szegedy et al., "Rethinking the Inception Architecture for Computer Vision," Proceedings of the IEEE Conference on Computer Vision and Pattern Recognition, Jun. 2016, pp. 2818-2826.

Tan et al., "EfficientNet: Rethinking Model Scaling for Convolutional Neural Networks," Proceedings of the 36th International Conference on Machine Learning, 2019, 10 pages.

Tarvainen et al., "Mean teachers are better role models: Weight-averaged consistency targets improve semi-supervised deep learning results," Advances in Neural Information Processing Systems, 2017, 10 pages.

Thomee et al., "YFCC100M: the new data in multimedia research," Communications of the ACM, Feb. 2016, 59(2):64-73.

Torralba et al., "80 Million Tiny Images: A Large Data Set for Nonparametric Object and Scene Recognition," IEEE Transactions on Pattern Analysis and Machine Learning, Nov. 2008, pp. 1958-1970.

Touvron et al., "Fixing the train-test resolution discrepancy," Advances in Neural Information Processing Systems, 2019, 11 pages.

Touvron et al., "Fixing the train-test resolution discrepancy: FixEfficientNet," arXiv, Nov. 18, 2020, 5 pages.

Verma et al., "Interpolation consistency training for semi-supervised learning," Proceedings of the Twenty-Eighth International Joint Conference on Artificial Intelligence, 2019, pp. 3635-3641.

Wang et al., "EnAET: Self-Trained Ensemble AutoEncoding Transformations for Semi-Supervised Learning," arXiv, Nov. 21, 2019, 10 pages.

Wang et al., "Meta-Semi: A Meta-learning Approach for Semi-supervised Learning," arXiv, Jul. 5, 2020, 18 pages.

Wang et al., "Optimizing Data Usage via Differentiable Rewards," Proceedings of the 37th International Conference on Machine Learning, 2020, 13 pages.

Williams, "Simple statistical gradient-following algorithms for connectionist reinforcement learning," Machine Learning, May 1992, pp. 229-256.

Xie et al., "Aggregated Residual Transformations for Deep Neural Networks," Proceedings of the IEEE Conference on Computer Vision and Pattern Recognition, Jul. 2017, pp. 1492-1500.

Xie et al., "Self-Training With Noisy Student Improves ImageNet Classification," Proceedings of the IEEE/CVF Conference on Computer Vision and Pattern Recognition, Jun. 2020, pp. 10687-10698.

Xie et al., "Unsupervised Data Augmentation for Consistency Training," Advances in Neural Information Processing Systems, 2020, 13 pages.

Yalniz et al., "Billion-scale semi-supervised learning for image classification," arXiv, May 2, 2019.

Yamada et al., "Shakedrop Regularization for Deep Residual Learning," IEEE Access, Dec. 18, 2019, 7:186126-186136.

Yarowsky, "Unsupervised Word Sense Disambiguation Rivaling Supervised Methods," 33rd Annual Meeting of the Association for Computational Linguistics, Jun. 1995, pp. 189-196.

You et al., "Large Batch Training of Convolutional Networks," arXiv, Sep. 13, 2017, 8 pages.

Yun et al., "CutMix: Regularization Strategy to Train Strong Classifiers With Localizable Features," Proceedings of the IEEE/CVF International Conference on Computer Vision, Oct. 2019, pp. 6023-6032.

Zagoruyko et al., "Wide Residual Networks," Proceedings of the British Machine Vision Conference, Sep. 2016, 12 pages.

Zhang et al., "mixup: Beyond Empirical Risk Minimization," International Conference on Learning Representations, 2018, 13 pages.

Zhang et al., "Be Your Own Teacher: Improve the Performance of Convolutional Neural Networks via Self Distillation," Proceedings of the IEEE/CVF International Conference on Computer Vision, Oct. 2019, pp. 3713-3722.

Zhang et al., "PolyNet: A Pursuit of Structural Diversity in Very Deep Networks," Proceedings of the IEEE Conference on Computer Vision and Pattern Recognition, Jul. 2017, pp. 718-726.

Zheng et al., "Meta Label Correction for Learning with Weak Supervision," arXiv, Nov. 10, 2019, 5 pages.

Zoph et al., "Rethinking Pre-training and Self-training," Advances in Neural Information Processing Systems, 2020, 13 pages.

Zoph et al., "Learning Transferable Architectures for Scalable Image Recognition," Proceedings of the IEEE Conference on Computer Vision and Pattern Recognition, Jun. 2018, pp. 8697-8710.

* cited by examiner

300

Compute first student gradient          302

Compute second student gradient          304

Compute teacher gradient          306

Compute approximation from the student gradients and the teacher gradient          308

META PSEUDO-LABELS

CROSS-REFERENCE TO RELATED APPLICATION

This application claims priority to U.S. Provisional Application No. 63/125,363, filed on Dec. 14, 2020. The disclosure of the prior application is considered part of and is incorporated by reference in the disclosure of this application.

BACKGROUND

This specification relates to training neural networks.

Neural networks are machine learning models that employ one or more layers of nonlinear units to predict an output for a received input. Some neural networks include one or more hidden layers in addition to an output layer. The output of each hidden layer is used as input to the next layer in the network, i.e., the next hidden layer or the output layer. Each layer of the network generates an output from a received input in accordance with current values of a respective set of parameters.

SUMMARY

This specification describes a system implemented as computer programs on one or more computers in one or more locations that trains, using a teacher neural network, a student neural network that is configured to perform a particular machine learning task. Generally, after the training, only the student neural network is deployed to perform the particular machine learning task on new inputs.

Particular embodiments of the subject matter described in this specification can be implemented so as to realize one or more of the following advantages.

Some conventional techniques use pseudo-labels generated by a teacher neural network to train a student neural network on unlabeled data. For example, pseudo-labels have been applied successfully to improve state-of-the-art models in many tasks, e.g., computer vision tasks such as image classification, object detection, and semantic segmentation. Pseudo-labels methods work by having a pair of neural networks, one as a teacher and one as a student. The teacher generates pseudo-labels on unlabeled inputs. These pseudo-labeled inputs are then combined with labeled images to train the student. Thanks to the abundance of pseudo-labeled data and, in some cases, the use of regularization methods such as data augmentation, the student learns to become better than the teacher.

Despite the strong performance of pseudo-labels methods in some circumstances, they have a significant drawback: if the pseudo-labels generated by the teacher are inaccurate, the student will learn from inaccurate data. As a result, the student may not end up improving on the performance of the teacher and, in some cases, may end up performing worse than the teacher. This drawback is also known as the problem of confirmation bias in pseudo-labeling.

Like pseudo-labels, the described techniques (referred to as "Meta Pseudo-labels") have a teacher network to generate pseudo-labels on unlabeled data to teach a student network. However, unlike pseudo-labels where the teacher is fixed, in Meta Pseudo-labels, the teacher is constantly adapted by the feedback of the student's performance on the labeled dataset. As a result, the teacher generates better pseudo-labels to teach the student. This allows the training of the student neural network to better make use of unlabeled training data, which is in many instances readily available and does not require computationally intensive and time intensive human labeling, in order to improve the performance of the final, deployed student neural network. More specifically, by the use of Meta Pseudo-labels in this specification, the system can correct the confirmation bias noted above by utilizing feedback from the student to inform the teacher to generate better pseudo-labels. That is, the teacher can observe how its pseudo-labels would affect the student and use the results of the observation to generate improved pseudo-labels.

The details of one or more embodiments of the subject matter of this specification are set forth in the accompanying drawings and the description below. Other features, aspects, and advantages of the subject matter will become apparent from the description, the drawings, and the claims.

BRIEF DESCRIPTION OF THE DRAWINGS

Like reference numbers and designations in the various drawings indicate like elements.

DETAILED DESCRIPTION

Figure 1A:
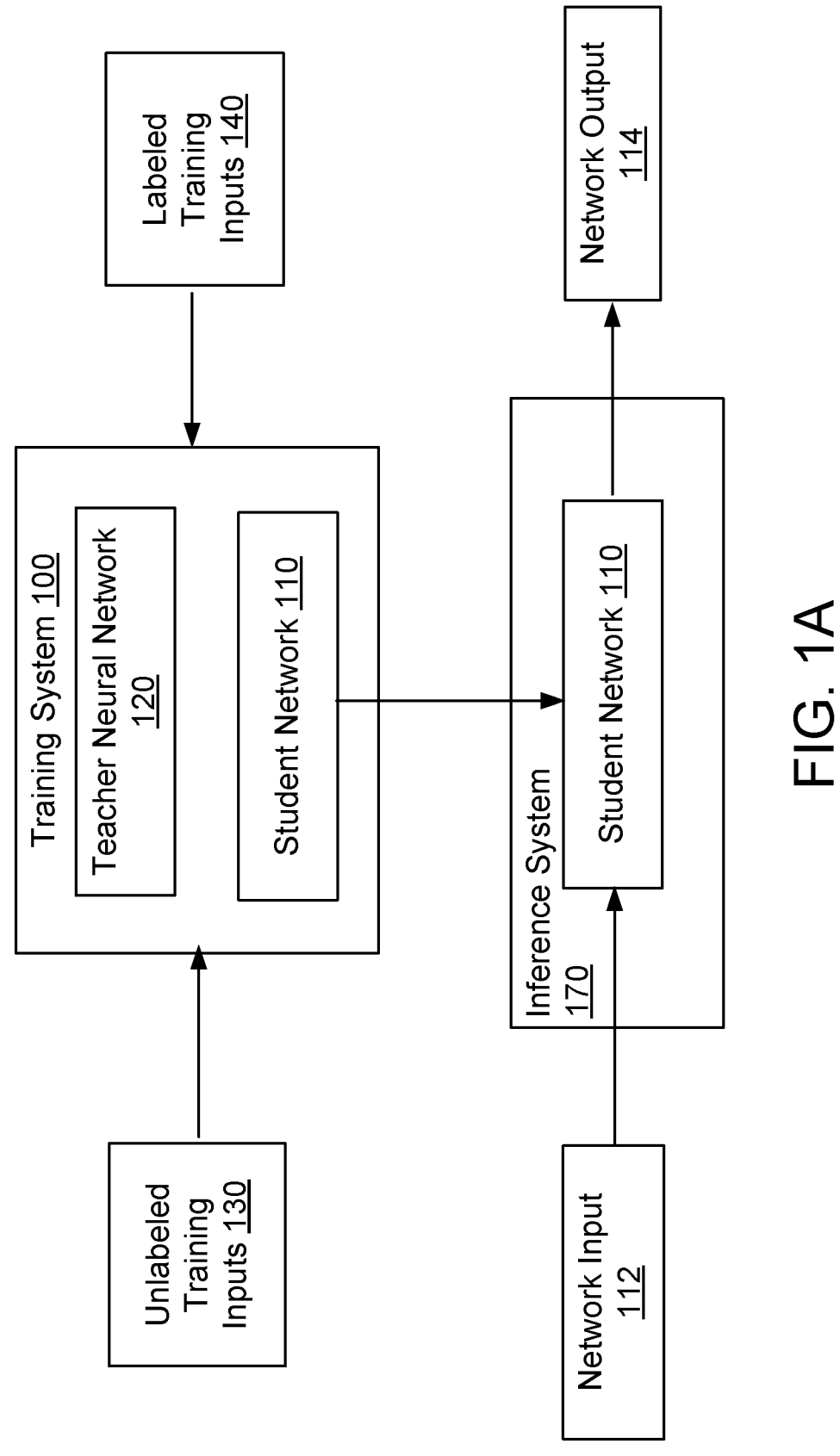
FIG. 1A shows an example training system.

FIG. 1A shows an example training system 100. The training system 100 is an example of a system implemented as computer programs on one or more computers in one or more locations, in which the systems, components, and techniques described below can be implemented.

The system 100 trains, using a teacher neural network 120, a student neural network 110 that is configured to perform a particular machine learning task. Generally, after the training, only the student neural network 110 is deployed to perform the particular machine learning task on new inputs.

That is, after training, an inference system 170 deploys the trained student neural network 110 on one or more computing devices to perform inference, i.e., to generate new network outputs 114 for the machine learning task for new network inputs 112.

The student neural network 110 and the teacher neural network 120 are generally both neural networks that are configured to perform the same machine learning task, i.e., they each are configured to process an input 112 for the task to generate a network output 114 for the task. Outputs generated by the teacher neural network 120 will also be referred to as teacher outputs. Similarly, outputs generated by the student neural network 120 will also be referred to as student outputs.

In some cases, the student neural network 110 and the teacher neural network 120 have the same architecture and, therefore the same number of parameters. In some other cases, however, the two neural networks have different architectures, with the teacher neural network 120 having a larger number of parameters than the student neural network 110. In these cases, a larger, less computationally efficient teacher neural network 120 is used during training to improve the performance of a smaller, computationally efficient student neural network 110 that can then be deployed, e.g., on an edge device or in another computing environment with limited computational budget. Thus, extra computational resources that are available at training time that may not be available after deployment can be successfully leveraged to improve the performance of the student neural network 110 that fits within the computational budget afforded to processing new inputs at inference (after deployment). For example, the teacher neural network 120 may have too large of a memory footprint or generate outputs with too long of a latency in order to be effectively deployed by the inference system 170. However, the training system 100 may be implemented in a data center with a large number of computing devices, and the extra computational resources that are available in the data center can be used to allow the teacher 120 to be used to improve the training of the student 110.

For example, the training system 100 can employ model parallelism during training. In model parallelism, the student neural network 110, the teacher neural network 120 can be partitioned across multiple different devices.

As a particular example, when the teacher 110 and the student 120 are both large, keeping two such networks in memory for the teacher and the student could exceed the available memory of the accelerators that are used for the training. The system 100 can employ model parallelism to mitigate this issue. For example, if the training process runs on a cluster of accelerator cores, the system can divide the cores into identical replicas to run with standard data parallelism with synchronized gradients. Within each replica, which runs on multiple cores, the system 100 can implement two types of model parallelism. In particular, when the inputs to the neural networks are images, each input image can be split along the width dimension into patches of equal size and be distributed to the multiple cores to process. Second, the system can split each weight tensor of the two networks into equal parts that are assigned to the multiple cores. Thus, each core can process a portion of an input image using a portion of the weights of each of the weight tensors of the teacher and student neural networks.

The student neural network 110 can be trained to perform any kind of machine learning task, i.e., can be configured to receive any kind of digital data input and to generate any kind of score, classification, or regression output based on the input.

In some cases, the student neural network 110 is a neural network that is configured to perform an image processing task, i.e., receive an input image and to process the input image to generate a network output for the input image.

The image can be any appropriate type of image. For example, the image can be a two-dimensional image, e.g., a two-dimensional image that has multiple channels (e.g., an RGB image). As another example, the image can be a hyperspectral image that represents a continuous spectrum of wavelengths, e.g., by identifying, for each pixel in the image, a distribution over the spectrum. As another example, the image can be a point cloud that includes multiple points, where each point has a respective coordinate, e.g., in a three-dimensional or a higher-dimensional coordinate space; as a particular example, the image can be a point cloud generated by a LIDAR sensor. As another example, the image can be a medical image generating by a medical imaging device; as particular examples, the image can be a computer tomography (CT) image, a magnetic resonance imaging (MM) image, an ultrasound image, an X-ray image, a mammogram image, a fluoroscopy image, or a positron-emission tomography (PET) image.

For example, the task may be image classification and the output generated by the student neural network 110 for a given image may be scores for each of a set of object categories, with each score representing an estimated likelihood that the image contains an image of an object belonging to the category.

As another example, the task can be image embedding generation and the output generated by the student neural network 110 can be a numeric embedding of the input image.

As yet another example, the task can be object detection and the output generated by the student neural network 110 can identify locations in the input image at which particular types of objects are depicted.

As yet another example, the task can be image segmentation and the output generated by the student neural network 110 can assign each pixel of the input image to a category from a set of categories.

As another example, if the inputs to the student neural network 110 are Internet resources (e.g., web pages), documents, or portions of documents or features extracted from Internet resources, documents, or portions of documents, the task can be to classify the resource or document, i.e., the output generated by the student neural network 110 for a given Internet resource, document, or portion of a document may be a score for each of a set of topics, with each score representing an estimated likelihood that the Internet resource, document, or document portion is about the topic.

As another example, if the inputs to the student neural network 110 are features of an impression context for a particular advertisement, the output generated by the student neural network 110 may be a score that represents an estimated likelihood that the particular advertisement will be clicked on.

As another example, if the inputs to the student neural network 110 are features of a personalized recommendation for a user, e.g., features characterizing the context for the recommendation, e.g., features characterizing previous actions taken by the user, the output generated by the student neural network 110 may be a score for each of a set of content items, with each score representing an estimated likelihood that the user will respond favorably to being recommended the content item.

As another example, if the input to the student neural network 110 is a sequence of text in one language, the output generated by the student neural network 110 may be a sequence of text in another language that is a translation of the input text into the other language.

As another example, the task may be an audio processing task. For example, if the input to the student neural network 110 is a sequence representing a spoken utterance, the output generated by the student neural network 110 may be a sequence of text that is a predicted transcript for the utterance in a natural language. As another example, the task may be a keyword spotting task where, if the input to the student neural network is a sequence representing a spoken utterance, the output generated by the student neural network can indicate whether a particular word or phrase ("hotword") was spoken in the utterance. As another example, if the input to the student neural network is a sequence representing a spoken utterance, the output generated by the student neural network can identify the natural language in which the utterance was spoken.

As another example, the task can be a natural language processing or understanding task, e.g., an entailment task, a paraphrase task, a textual similarity task, a sentiment task, a sentence completion task, a grammaticality task, and so on, that operates on a sequence of text in some natural language.

As another example, the task can be a text to speech task, where the input is text in a natural language or features of text in a natural language and the network output is a spectrogram or other data defining audio of the text being spoken in the natural language.

As another example, the task can be a health prediction task, where the input is electronic health record data for a patient and the output is a prediction that is relevant to the future health of the patient, e.g., a predicted treatment that should be prescribed to the patient, the likelihood that an adverse health event will occur to the patient, or a predicted diagnosis for the patient.

As another example, the task can be an agent control task, where the input is an observation characterizing the state of an environment and the output defines an action to be performed by the agent in response to the observation. The agent can be, e.g., a real-world or simulated robot, a control system for an industrial facility, or a control system that controls a different kind of agent.

The teacher neural network 120 and the student neural network 110 can each have any appropriate architecture that allows the neural network to map network inputs 102 to network outputs 112 in the format required by the machine learning task. For example, when the task requires processing an image, the neural networks 110 and 120 can be convolutional neural networks or self-attention based neural networks, e.g., vision Transformers. As another example, when the task requires processing a sequence, generating a sequence, or both, the neural networks 110 and 120 can be recurrent neural networks or self-attention based neural networks, e.g., Transformers, BERT, or GPT based models.

To train the student neural network 110, the system trains the student neural network 110 jointly with the teacher neural network 120 by repeatedly alternating between updating the parameters of the student 110 ("student parameters") and updating the parameters of the teacher 120 ("teacher parameters").

That is, unlike other techniques that first train the teacher neural network and then hold the teacher parameters fixed during the training of the student neural network, the system 100 trains both the student neural network 110 and the teacher neural network 120 jointly.

In particular, at each of multiple training iterations, the system 100 uses unlabeled training inputs 130 and labeled training inputs 140 to train both the student neural network 110 and the teacher neural network 120, i.e., to update both the student parameters and the teacher parameters.

The labeled training inputs 140 are referred to as "labeled" because the system 100 has access to, for each labeled training input 140, a respective ground truth output for the machine learning task, i.e., an output that should be generated by performing the machine learning task on the labeled training input 140. The ground truth outputs are outputs that have been identified as being accurate outputs for the machine learning task by an external source, e.g., by a human labeler, and not by the teacher neural network. For a classification task, the ground truth output will generally be a probability distribution that assigns a non-zero value to one or more actual classes for the image while assigning a zero value for all other classes.

As used in this specification, a classification task is any task that that requires a neural network to generate an output that specifies a probability distribution over a plurality of classes. Examples of classification tasks include image classification, where the classes are, e.g., object categories, text classification, machine translation (where the classes are different possible sequences in the target language), speech recognition (where the classes are different possible transcriptions of the speech), text-to-speech (where the classes are different possible utterances of the text), object detection, image segmentation, and so on.

The unlabeled training inputs 130 are referred to as "unlabeled" because the system 100 does not have access to any ground truth outputs for any of the unlabeled training inputs 130. Because the unlabeled training inputs 130 are not required to be evaluated by an external source (which can be a costly and time intensive process), the system 100 can have access to a much larger amount of unlabeled training inputs 130 than labeled training inputs 140.

Performing training iterations using labeled and unlabeled training inputs will be described in more detail below with reference to FIG. 2.

As described above, after training, the system 100 or a different inference system 170 deploys the student neural network 110 for performing the machine learning task. For example, the system 100 or another system can provide the trained parameter values of the student neural network to an edge device, e.g., a mobile phone, a smart personal assistant device, or other IoT device, over a wired or wireless network connection, so that the student neural network 110 can be used to perform the machine learning task on the edge device.

Thus, by making use of the teacher neural network 120, the system can effectively incorporate the unlabeled training inputs into the training of the student neural network 110 and can effectively make use of the additional computational resources that are available during training that may not be available at inference.

Figure 1B:
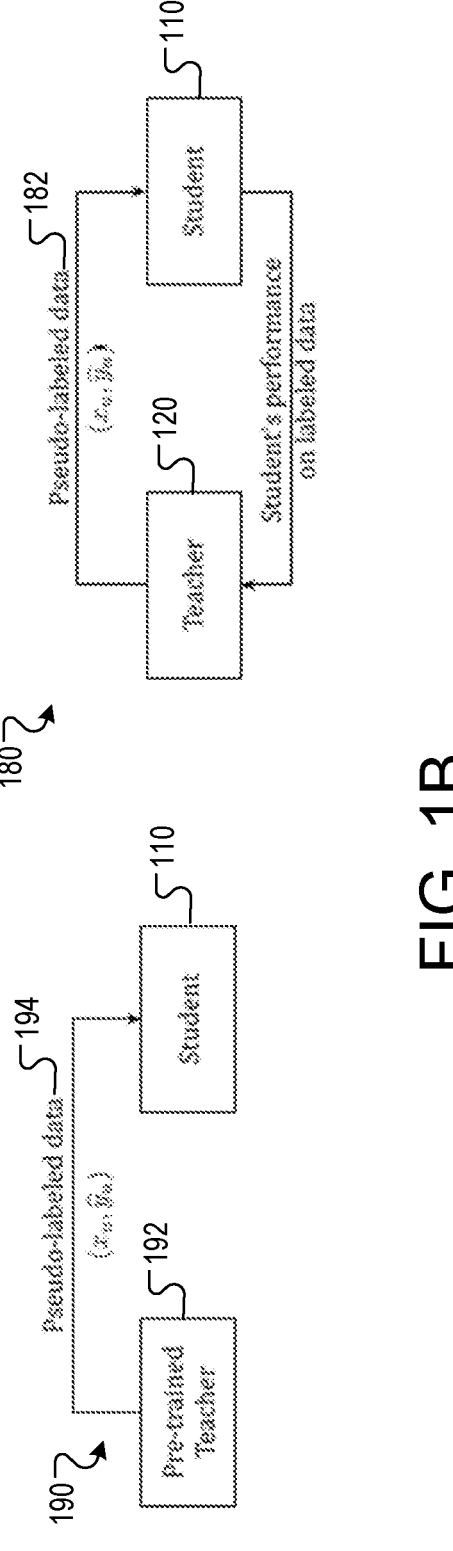
FIG. 1B shows a comparison between the described training scheme and a convolutional pseudo-labels scheme.

FIG. 1B shows a comparison between the described training scheme 180 and a convolutional pseudo-labels scheme 190.

In the conventional pseudo-labels scheme 190, a training system first trains the teacher neural network 120 on labeled training data to generate a "pre-trained teacher" 192. The training system then uses the pre-trained teacher 192 to generate pseudo-labels $\hat{y}_u$ for each unlabeled training input $x_u$ in a set of unlabeled training data. The training system then uses the pseudo-labeled data 194 and, in some cases, the labeled training data to train the student neural network 110 without further training the teacher neural network 120 or adjusting the pseudo-labels for the pseudo-labeled data 194.

In the described training scheme 180, the training system trains the teacher neural network 120 along with the student neural network 110. The student neural network 110 is trained based on the pseudo-labeled data 182 generated by the teacher (top arrow). The teacher 120 is trained based on the performance of the student 110 on labeled data (bottom arrow). By training the two neural networks jointly in this manner, the teacher 120 learns to generate improved pseudo-labels, i.e., pseudo-labels that result in the student 110 performing better on labeled data. This results in a trained student neural network 110 that significantly outperforms the teacher neural network 120 even in circumstances where the conventional training scheme 190 would have failed because the pseudo-labels 194 were inaccurate.

Figure 2:
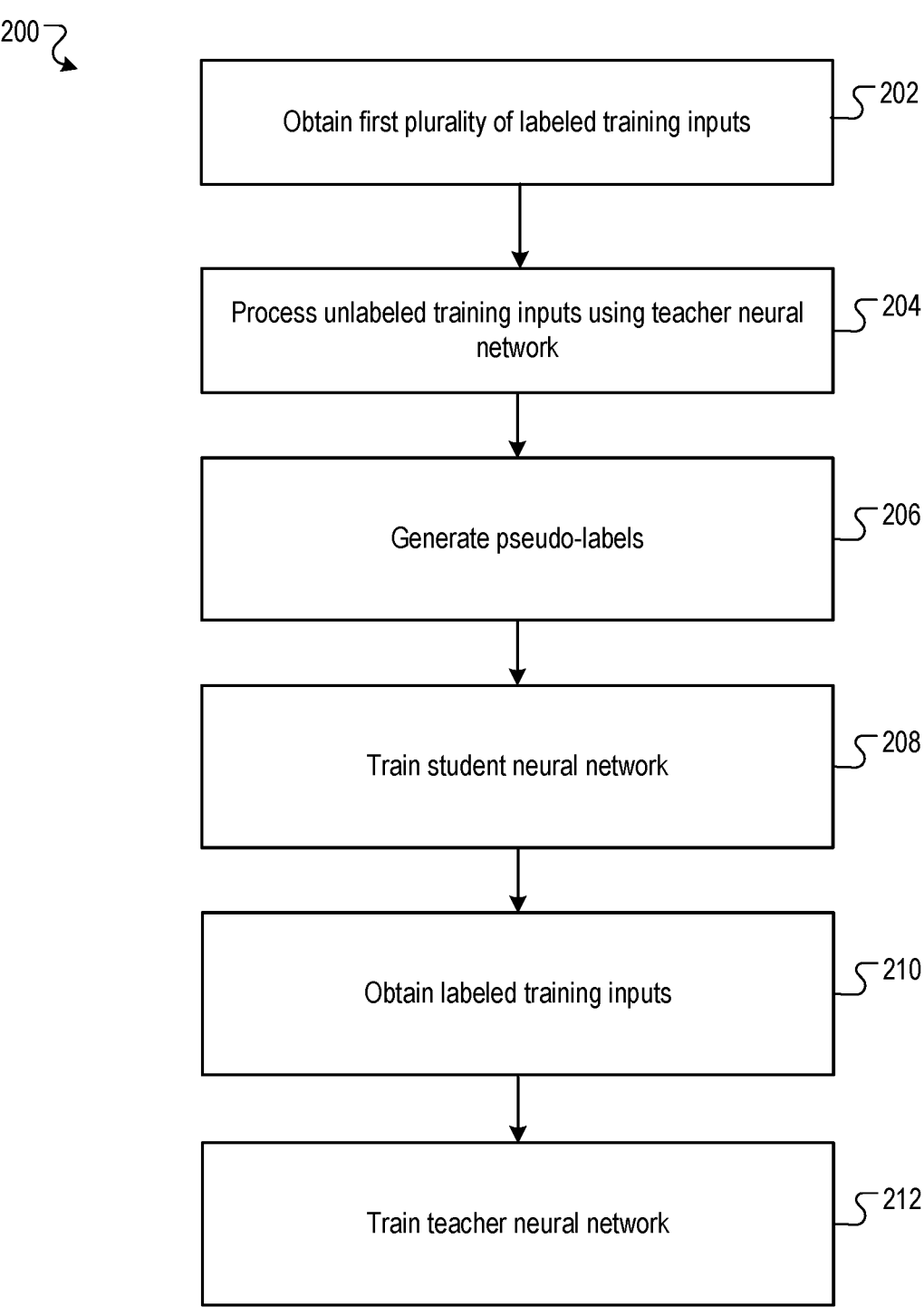
FIG. 2 is a flow diagram of an example process for training a student neural network.

FIG. 2 is a flow diagram of an example process 200 for performing a training iteration during the training of a student neural network. For convenience, the process 200 will be described as being performed by a system of one or more computers located in one or more locations. For example, a training system, e.g., the training system 100 of FIG. 1A, appropriately programmed, can perform the process 200.

The system can repeatedly perform iterations of the process 200 to repeatedly update the student parameters and the teacher parameters until a termination criterion has been satisfied, e.g., until a threshold number of iterations of the process 200 have been performed, until a threshold amount of wall clock time has elapsed, or until the values of the student parameters have converged.

In some implementations, the system performs iterations of the process 200 to train both the student neural network and the teacher neural network from scratch, i.e., the system initializes the values of the student parameters and the teacher parameters using a parameter initialization technique prior to performing the first iteration of the process 200.

In some other implementations, the system pre-trains the teacher neural network on labeled training data prior to performing the first iteration of the process 200.

The system obtains a first plurality of unlabeled training inputs $x_u$ for the iteration (step 202). The system will generally obtain different unlabeled training inputs at different iterations, e.g., by sampling a fixed number of inputs from a larger set of unlabeled inputs.

The system processes each of the unlabeled training inputs $x_u$ in the first plurality of unlabeled training inputs using the teacher neural network and in accordance with current values of the teacher parameters as of the training iteration to generate a respective teacher output for the machine learning task for each of the unlabeled training inputs (step 204).

The system generates, for each of the unlabeled training inputs $x_u$, a respective pseudo-label $\hat{y}_u$ from the respective teacher output for the unlabeled training input (step 206).

In some implementations, the system uses a "soft" pseudo-labeling scheme and sets the respective pseudo-label for each unlabeled training input to be the same as the teacher output for the unlabeled training input.

In some other implementations, when the task is a classification task, i.e., such that each teacher and student output for any given input specifies a respective probability distribution over a plurality of classes for a given input, the system uses a "hard" pseudo-labeling scheme.

In the hard pseudo-labeling scheme, to generate the respective pseudo-label for a given unlabeled training input, the system selects one of the plurality of classes using the probability distribution specified by the teacher output for the given training input and then generates a pseudo-label that identifies the sampled class as the ground-truth output for the unlabeled training input. That is, the pseudo-label specifies a probability distribution that has a 1 for the sampled class and a zero for all other classes. The system can select a class by either selecting the class with the highest probability in the teacher output or by sampling a class from the probability distribution in the teacher output.

The system then trains the student neural network to determine updated values of the student parameters $\theta_S$ from current values of the student parameters using the first plurality of unlabeled training inputs $x_u$ and the corresponding pseudo-labels $\hat{y}_u$ (step 208).

In particular, the system trains the student neural network by optimizing a student objective function $L_u$ that measures, for each of the unlabeled training inputs in the first plurality of unlabeled training inputs, an error between (i) a respective student output for the unlabeled training input generated by processing the unlabeled training input using the student neural network in accordance with the current values of the student parameters and (ii) the respective pseudo-label for the unlabeled training input.

For example, for classification tasks, the student objective function can be a cross-entropy loss that measures, for each unlabeled training input, the cross-entropy between (i) a respective student output for the unlabeled training input generated by processing the unlabeled training input using the student neural network in accordance with the current values of the student parameters and (ii) the respective pseudo-label for the unlabeled training input. That is, the student objective function $L_u$ can satisfy:

$$L_u = E_{x_u}[CE(\hat{y}_u, S(x_u; \theta_s))],$$

where $E_{x_u}$ is the expectation operator with respect to unlabeled training inputs $x_u$, CE is the cross-entropy, $\hat{y}_u$ is the pseudo-label for the unlabeled training input $x_u$ generated from a teacher output $T(x_u; \theta_T)$ for the unlabeled training input generated in accordance with the current values of the teacher parameters $\theta_T$, and $S(x_u; \theta_s)$ is the student output for the unlabeled training input $x_u$ generated in accordance with the current values of the student parameters $\theta_S$.

The system can perform the training by computing gradients of the student objective function with respect to the student parameters and then using the gradients to update the current values of the student parameters. For example, the updated values of the student parameters can be equal to:

$$\theta_S - \downarrow_S \cdot \nabla_{\theta_S} L_u,$$

where $\eta_S$ is the learning rate for updating the student neural network, and $\nabla_{\theta_S} L_u$ is the gradient of the student objective with respect to the student parameters.

In some implementations, the system employs data augmentation during the training of the student neural network. For example, the system can apply a RandAugment or an AutoAugment augmentation policy during the training.

The system also trains the teacher neural network to optimize a teacher objective function.

The teacher objective function includes a first term that measures, for each of the labeled training inputs in a first plurality of labeled training inputs, the performance of the student neural network on the labeled training input after the student parameter values have been updated.

Thus, to train the teacher neural network, the system also obtains a first plurality of labeled training inputs and, for each labeled training input in the first plurality of labeled training inputs, a respective ground truth output for the machine learning task (step 210).

The ground truth outputs are outputs that have been identified as being accurate outputs for the machine learning task by an external source, e.g., by a human labeler, and not by the teacher neural network. For a classification task, the ground truth output will generally be a probability distribution that assigns a non-zero value to one or more actual classes for the image while assigning a zero value for all other classes.

The system trains the teacher neural network on at least the first plurality of labeled training inputs to determine updated values of the teacher parameters by optimizing the teacher objective function (step 212).

For example, the first term can measure, for each labeled training input, a cross-entropy between (i) a respective student output for the labeled training input generated by processing the labeled training input using the student neural network in accordance with the updated values of the student parameters and (ii) the respective ground truth output for the labeled training input.

In some cases, the teacher objective function includes only the first term. In some other cases, the teacher objective also includes one or more auxiliary loss terms that can assist in further improving the quality of the pseudo-labels. The system can employ any of a variety of auxiliary losses in order to improve the training of the teacher.

As one example, the teacher objective function can include a supervised learning term that measures, for each labeled training input in a second plurality of labeled training inputs, an error between (i) a respective teacher output for the labeled training input generated by processing the labeled training input using the teacher neural network in accordance with the current values of the teacher parameters and (ii) a respective ground truth output for the labeled training input.

In some implementations, the first plurality of labeled training inputs and the second plurality of labeled training inputs are the same while in other implementations the system separately samples the second plurality from the larger set of labeled inputs.

As another example, the teacher objective function can also include a semi-supervised learning term that measures, for a second plurality of unlabeled training inputs, the performance of the teacher neural network in accordance with the current values of the teacher parameters on a semi-supervised learning task as measured on the second plurality of unlabeled training inputs.

In some implementations, the first plurality of unlabeled training inputs and the second plurality of unlabeled training inputs are the same while in other implementations the system separately samples the second plurality from the larger set of unlabeled inputs.

The system can use any of a variety semi-supervised learning tasks. For example, the system can use an Unsupervised data augmentation (UDA) task as the semi-supervised task.

The system can perform the training by computing gradients of the teacher objective function with respect to the teacher parameters and then using an optimizer, e.g., SGD, Adam, or rmsProp to update the current values of the teacher parameters using the gradients.

In particular the system can compute the gradient of the teacher objective function by computing a respective gradient of each of the terms of the objective function and then summing the gradients of the terms.

When used, the system can compute the respective gradients of each of the auxiliary terms conventionally, e.g., through backpropagation.

When the system uses the soft pseudo-labeling scheme, the system can compute the gradient of the first term through backpropagation. In particular, because the operations to generate the soft pseudo-label are differentiable, the system can compute the gradient of the teacher objective through backpropagation by treating the current values of the student parameters as fixed parameters that are not dependent on the teacher parameters and backpropagating through the generation of the pseudo-label.

When the system uses the hard pseudo-labeling scheme, the generation of the hard pseudo-label is not differentiable, i.e., because it requires a hard selection of one of the classes, and the system cannot directly compute the gradient of the first term through backpropagation. Instead, the system computes an approximation of the gradient of the first term with respect to the teacher parameters. Computing this approximation is described in more detail below with reference to FIG. 3.

In some implementations, the system employs data augmentation during the training of the teacher neural network. For example, the system can apply a RandAugment or an AutoAugment augmentation policy during the training.

By repeatedly alternating between updating the teacher and the student, i.e., by repeatedly performing iterations of the process 200, the teacher learns to generate better pseudo-labels, resulting in a more accurate student neural network after training is completed.

Optionally, after the joint training, i.e., after the termination criteria for performing iterations of the process 200 have been satisfied, the system can fine-tune the student neural network on labeled data to generate final, trained values of the student parameters. The labeled data that is used for the fine-tuning can be, e.g., all of the labeled data that was used during any of the iterations of the process 200, some randomly selected subset of the labeled data used during the iterations of the process 200, or a held out set of labeled data that was not used during any of the iterations of the process 200.

Figure 3:
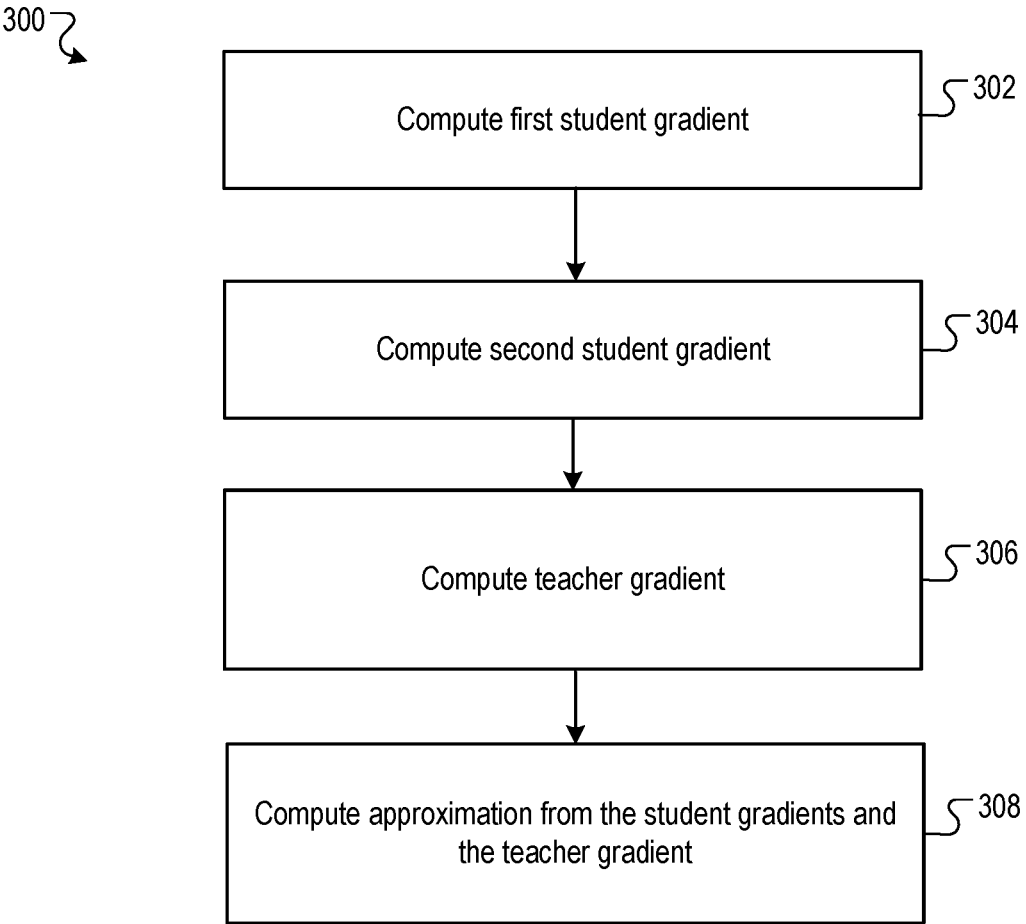
FIG. 3 is a flow diagram of an example process for computing an approximation of a gradient of the first term of the teacher objective function.

FIG. 3 is a flow diagram of an example process 300 for computing an approximate gradient of the first term of the teacher objective function with respect to the teacher parameters. For convenience, the process 300 will be described as being performed by a system of one or more computers located in one or more locations. For example, a training system, e.g., the training system 100 of FIG. 1, appropriately programmed, can perform the process 300.

The system computes a first student gradient with respect to the student parameters of the student objective function evaluated at the current values of the student parameters and for the first plurality of unlabeled training inputs (step 302). For example, when the student objective function is the cross entropy, the system computes:

$$\nabla_{\theta_T} CE(\hat{Y}_u; T\,(x_u; \theta_T)).$$

This gradient can be computed through backpropagation because it does not depend on the pseudo-labels. More specifically, this gradient can be the same as the one that was used to update the student parameters in step 204 of the process 200.

The system computes a second student gradient with respect to the student parameters of the first term of the teacher objective function evaluated at the updated values of the student parameters and for the first plurality of labeled training inputs (step 304). For example, when the objective function measures the cross-entropy, the system computes $$\nabla_{\theta_T} CE(\hat{Y}_u; T\,(x_u; \theta_T)).$$

where $\theta_S'$ are the updated values of the student parameters, $x_l$ is a labeled training input, $y_l$ is the ground truth label for the labeled training input, and $S(x_l; \theta_S)$ is the student output generated by processing the labeled training input using the student neural network in accordance with the updated values of the student parameters.

The system computes a teacher gradient with respect to the teacher parameters of a second objective that measures, for each of the first plurality of unlabeled training inputs, an error between (i) the respective pseudo-label for the unlabeled training input and (ii) the respective teacher output for the unlabeled training input generated by the teacher neural network in accordance with the current values of the teacher parameters (step 306).

For example, when the objective is the cross entropy, the system computes:

$$\nabla_{\theta_T} CE(\hat{Y}_u; T\,(x_u; \theta_T)).$$

The system computes the approximation from the first student gradient, the second student gradient, and the teacher gradient (step 308).

As a particular example, the system can determine a feedback coefficient from the first and second student gradients and multiply the teacher gradient by the feedback coefficient to determine the approximation. The feedback coefficient can be equal to, e.g., the product of (i) the student learning rate and (ii) a dot product of the first and second student gradients. As another example, the feedback coefficient can be equal to the product of (i) the student learning rate and (ii) the cosine distance between the first and second student gradients. Because the cosine distance has a smaller value range, the cosine distance can improve the numerical stability of the updates to the teacher during training. As yet another example, the system can maintain a moving average of feedback coefficients determined using one of the two techniques above and can generate the final feedback coefficient by subtracting the moving average from the feedback coefficient computed using one of the above techniques.

By computing the approximation using the process 300, the system can account for the non-differentiability of the "hard" pseudo-labeling scheme by computing an accurate approximation of the gradient that results in high quality updates to the teacher. That is, computing the approximation of the process 300 allows the system to leverage potentially higher-quality hard pseudo-labels during the training of the student while still training the teacher to generate accurate teacher outputs that further improve the training of the student at subsequent training steps.

This specification uses the term "configured" in connection with systems and computer program components. For a system of one or more computers to be configured to perform particular operations or actions means that the system has installed on it software, firmware, hardware, or a combination of them that in operation cause the system to perform the operations or actions. For one or more computer programs to be configured to perform particular operations or actions means that the one or more programs include instructions that, when executed by data processing apparatus, cause the apparatus to perform the operations or actions.

Embodiments of the subject matter and the functional operations described in this specification can be implemented in digital electronic circuitry, in tangibly-embodied computer software or firmware, in computer hardware, including the structures disclosed in this specification and their structural equivalents, or in combinations of one or more of them. Embodiments of the subject matter described in this specification can be implemented as one or more computer programs, i.e., one or more modules of computer program instructions encoded on a tangible non transitory storage medium for execution by, or to control the operation of, data processing apparatus. The computer storage medium can be a machine-readable storage device, a machine-readable storage substrate, a random or serial access memory device, or a combination of one or more of them. Alternatively or in addition, the program instructions can be encoded on an artificially generated propagated signal, e.g., a machine-generated electrical, optical, or electromagnetic signal, that is generated to encode information for transmission to suitable receiver apparatus for execution by a data processing apparatus.

The term "data processing apparatus" refers to data processing hardware and encompasses all kinds of apparatus, devices, and machines for processing data, including by way of example a programmable processor, a computer, or multiple processors or computers.

The apparatus can also be, or further include, special purpose logic circuitry, e.g., an FPGA (field programmable gate array) or an ASIC (application specific integrated circuit). The apparatus can optionally include, in addition to hardware, code that creates an execution environment for computer programs, e.g., code that constitutes processor firmware, a protocol stack, a database management system, an operating system, or a combination of one or more of them.

A computer program, which may also be referred to or described as a program, software, a software application, an app, a module, a software module, a script, or code, can be written in any form of programming language, including compiled or interpreted languages, or declarative or procedural languages; and it can be deployed in any form, including as a stand alone program or as a module, component, subroutine, or other unit suitable for use in a computing environment. A program may, but need not, correspond to a file in a file system. A program can be stored in a portion of a file that holds other programs or data, e.g., one or more scripts stored in a markup language document, in a single file dedicated to the program in question, or in multiple coordinated files, e.g., files that store one or more modules, sub programs, or portions of code. A computer program can be deployed to be executed on one computer or on multiple computers that are located at one site or distributed across multiple sites and interconnected by a data communication network.

In this specification, the term "database" is used broadly to refer to any collection of data: the data does not need to be structured in any particular way, or structured at all, and it can be stored on storage devices in one or more locations. Thus, for example, the index database can include multiple collections of data, each of which may be organized and accessed differently.

Similarly, in this specification the term "engine" is used broadly to refer to a software-based system, subsystem, or process that is programmed to perform one or more specific functions. Generally, an engine will be implemented as one or more software modules or components, installed on one or more computers in one or more locations. In some cases, one or more computers will be dedicated to a particular engine; in other cases, multiple engines can be installed and running on the same computer or computers.

The processes and logic flows described in this specification can be performed by one or more programmable computers executing one or more computer programs to perform functions by operating on input data and generating output. The processes and logic flows can also be performed by special purpose logic circuitry, e.g., an FPGA or an ASIC, or by a combination of special purpose logic circuitry and one or more programmed computers.

Computers suitable for the execution of a computer program can be based on general or special purpose microprocessors or both, or any other kind of central processing unit. Generally, a central processing unit will receive instructions and data from a read only memory or a random access memory or both. The essential elements of a computer are a central processing unit for performing or executing instructions and one or more memory devices for storing instructions and data. The central processing unit and the memory can be supplemented by, or incorporated in, special purpose logic circuitry. Generally, a computer will also include, or be operatively coupled to receive data from or transfer data to, or both, one or more mass storage devices for storing data, e.g., magnetic, magneto optical disks, or optical disks. However, a computer need not have such devices. Moreover, a computer can be embedded in another device, e.g., a mobile telephone, a personal digital assistant (PDA), a mobile audio or video player, a game console, a Global Positioning System (GPS) receiver, or a portable storage device, e.g., a universal serial bus (USB) flash drive, to name just a few.

Computer readable media suitable for storing computer program instructions and data include all forms of non volatile memory, media and memory devices, including by way of example semiconductor memory devices, e.g., EPROM, EEPROM, and flash memory devices; magnetic disks, e.g., internal hard disks or removable disks; magneto optical disks; and CD ROM and DVD-ROM disks.

To provide for interaction with a user, embodiments of the subject matter described in this specification can be implemented on a computer having a display device, e.g., a CRT (cathode ray tube) or LCD (liquid crystal display) monitor, for displaying information to the user and a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input. In addition, a computer can interact with a user by sending documents to and receiving documents from a device that is used by the user; for example, by sending web pages to a web browser on a user's device in response to requests received from the web browser. Also, a computer can interact with a user by sending text messages or other forms of message to a personal device, e.g., a smartphone that is running a messaging application, and receiving responsive messages from the user in return.

Data processing apparatus for implementing machine learning models can also include, for example, special-purpose hardware accelerator units for processing common and compute-intensive parts of machine learning training or production, i.e., inference, workloads.

Machine learning models can be implemented and deployed using a machine learning framework, e.g., a TensorFlow framework.

Embodiments of the subject matter described in this specification can be implemented in a computing system that includes a back end component, e.g., as a data server, or that includes a middleware component, e.g., an application server, or that includes a front end component, e.g., a client computer having a graphical user interface, a web browser, or an app through which a user can interact with an implementation of the subject matter described in this specification, or any combination of one or more such back end, middleware, or front end components. The components of the system can be interconnected by any form or medium of digital data communication, e.g., a communication network. Examples of communication networks include a local area network (LAN) and a wide area network (WAN), e.g., the Internet.

The computing system can include clients and servers. A client and server are generally remote from each other and typically interact through a communication network. The relationship of client and server arises by virtue of computer programs running on the respective computers and having a client-server relationship to each other. In some embodiments, a server transmits data, e.g., an HTML page, to a user device, e.g., for purposes of displaying data to and receiving user input from a user interacting with the device, which acts as a client. Data generated at the user device, e.g., a result of the user interaction, can be received at the server from the device.

While this specification contains many specific implementation details, these should not be construed as limitations on the scope of any invention or on the scope of what may be claimed, but rather as descriptions of features that may be specific to particular embodiments of particular inventions. Certain features that are described in this specification in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially be claimed as such, one or more features from a claimed combination can in some cases be excised from the combination, and the claimed combination may be directed to a sub combination or variation of a subcombination.

Similarly, while operations are depicted in the drawings and recited in the claims in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system modules and components in the embodiments described above should not be understood as requiring such separation in all embodiments, and it should be understood that the described program components and systems can generally be integrated together in a single software product or packaged into multiple software products.

Particular embodiments of the subject matter have been described. Other embodiments are within the scope of the following claims. For example, the actions recited in the claims can be performed in a different order and still achieve desirable results. As one example, the processes depicted in the accompanying figures do not necessarily require the particular order shown, or sequential order, to achieve desirable results. In some cases, multitasking and parallel processing may be advantageous.

What is claimed is:

1. A method performed by one or more computers and for training a student neural network having a plurality of student parameters to perform a machine learning task, the method comprising:

training the student neural network jointly with a teacher neural network, wherein the teacher neural network has a plurality of teacher parameters, the joint training comprising repeatedly performing the following:

obtaining a first plurality of unlabeled training inputs;

processing each of the unlabeled training inputs in the first plurality of unlabeled training inputs using the teacher neural network and in accordance with current values of the teacher parameters to generate a respective teacher output for the machine learning task for each of the unlabeled training inputs;

generating by the teacher neural network, for each of the unlabeled training inputs, a respective pseudo-label for the unlabeled training input from the respective teacher output for the unlabeled training input;

training the student neural network to determine updated values of the student parameters from current values of the student parameters by optimizing a student objective function that measures, for each of the unlabeled training inputs in the first plurality of unlabeled training inputs, an error between (i) a respective student output for the unlabeled training input generated by processing the unlabeled training input using the student neural network in accordance with the current values of the student parameters and (ii) the respective pseudo-label for the unlabeled training input, wherein each teacher and student output for the machine learning task specifies a respective probability distribution over a plurality of classes and wherein generating, for each of the unlabeled training inputs, the respective pseudo-label for the unlabeled training input comprises:

selecting one of the classes using the probability distribution specified by the teacher output; and generating a pseudo-label that identifies the selected class as the ground-truth output for the unlabeled training input;

obtaining a first plurality of labeled training inputs and, for each labeled training input in the first plurality of labeled training inputs, a respective ground truth output for the machine learning task; and training the teacher neural network to determine updated values of the teacher parameters using student outputs generated by the student neural network for the labeled training inputs, wherein training the teacher neural network comprises optimizing a teacher objective function that includes a first term that measures, for each of the labeled training inputs in the first plurality of labeled training inputs, an error between (i) a respective student output for the labeled training input generated by processing the labeled training input using the student neural network in accordance with the updated values of the student parameters and (ii) the respective ground truth output for the labeled training input, and wherein optimizing the teacher objective comprises an approximate gradient of the first term of the teacher objective function with respect to the teacher parameters.

2. The method of claim 1, wherein the total number of teacher parameters of the teacher neural network is greater than the total number of student parameters of the student neural network.

3. The method of claim 1, wherein the teacher objective function also includes a supervised learning term that measures, for each labeled training input in a second plurality of labeled training inputs, an error between (i) a respective teacher output for the labeled training input generated by processing the labeled training input using the teacher neural network in accordance with the current values of the teacher parameters and (ii) a respective ground truth output for the labeled training input.

4. The method of claim 3, wherein the first plurality of labeled training inputs are the same as the second plurality of labeled training inputs.

5. The method of claim 1, wherein the teacher objective function also includes a semi-supervised learning term that measures, for a second plurality of unlabeled training inputs, a performance of the teacher neural network in accordance with the current values of the teacher parameters on a semi-supervised learning task as measured on the second plurality of unlabeled training inputs.

6. The method of claim 5, wherein the first plurality of unlabeled training inputs are the same as the second plurality of unlabeled training inputs.

7. The method of claim 1, wherein, for each of the unlabeled training inputs, the respective pseudo-label for the unlabeled training input is the same as the respective teacher output for the unlabeled training input.

8. The method of claim 1, wherein selecting one of the classes using the probability distribution specified by the teacher output comprises:

sampling one of the classes from the probability distribution specified by the teacher output.

9. The method of claim 1, wherein computing an approximate gradient of the first term of the teacher objective function comprises:

computing a first student gradient with respect to the student parameters of the student objective function evaluated at the current values of the student parameters and for the first plurality of unlabeled training inputs;

computing a second student gradient with respect to the student parameters of the first term of the teacher objective function evaluated at the updated values of the student parameters and for the first plurality of labeled training inputs;

computing a teacher gradient with respect to the teacher parameters of a second objective that measures, for each of the first plurality of unlabeled training inputs, an error between (i) the respective pseudo-label for the unlabeled training input and (ii) the respective teacher output for the unlabeled training input generated by the teacher neural network in accordance with the current values of the teacher parameters; and computing the approximation from the first student gradient, the second student gradient, and the teacher gradient.

10. The method of claim 9, wherein computing the approximation from the first student gradient, the second student gradient, and the teacher gradient comprises:

determining a feedback coefficient from the first and second student gradients; and multiplying the teacher gradient by the feedback coefficient.

11. The method of claim 1, further comprising:

after the joint training, further training the student neural network on a third plurality of labeled training inputs through supervised learning.

12. The method of claim 1, further comprising:

before the joint training, training the teacher neural network on a fourth plurality of labeled training inputs through supervised learning.

13. One or more non-transitory computer-readable storage media storing instructions that when executed by one or more computers cause the one or more computers to perform operations for training a student neural network having a plurality of student parameters to perform a machine learning task, the operations comprising:

training the student neural network jointly with a teacher neural network, wherein the teacher neural network has a plurality of teacher parameters, the joint training comprising repeatedly performing the following:

obtaining a first plurality of unlabeled training inputs;

processing each of the unlabeled training inputs in the first plurality of unlabeled training inputs using the teacher neural network and in accordance with current values of the teacher parameters to generate a respective teacher output for the machine learning task for each of the unlabeled training inputs;

generating by the teacher neural network, for each of the unlabeled training inputs, a respective pseudo-label for the unlabeled training input from the respective teacher output for the unlabeled training input;

training the student neural network to determine updated values of the student parameters from current values of the student parameters by optimizing a student objective function that measures, for each of the unlabeled training inputs in the first plurality of unlabeled training inputs, an error between (i) a respective student output for the unlabeled training input generated by processing the unlabeled training input using the student neural network in accordance with the current values of the student parameters and (ii) the respective pseudo-label for the unlabeled training input, wherein each teacher and student output for the machine learning task specifies a respective probability distribution over a plurality of classes and wherein generating, for each of the unlabeled training inputs, the respective pseudo-label for the unlabeled training input comprises:

selecting one of the classes using the probability distribution specified by the teacher output; and generating a pseudo-label that identifies the selected class as the ground-truth output for the unlabeled training input;

obtaining a first plurality of labeled training inputs and, for each labeled training input in the first plurality of labeled training inputs, a respective ground truth output for the machine learning task; and training the teacher neural network to determine updated values of the teacher parameters using student outputs generated by the student neural network for the labeled training inputs, wherein training the teacher neural network comprises optimizing a teacher objective function that includes a first term that measures, for each of the labeled training inputs in the first plurality of labeled training inputs, an error between (i) a respective student output for the labeled training input generated by processing the labeled training input using the student neural network in accordance with the updated values of the student parameters and (ii) the respective ground truth output for the labeled training input, and wherein optimizing the teacher objective comprises an approximate gradient of the first term of the teacher objective function with respect to the teacher parameters.

14. A system comprising one or more computers and one or more storage devices storing instructions that when executed by the one or more computers cause the one or more computers to perform operations for training a student neural network having a plurality of student parameters to perform a machine learning task, the operations comprising:

training the student neural network jointly with a teacher neural network, wherein the teacher neural network has a plurality of teacher parameters, the joint training comprising repeatedly performing the following:

obtaining a first plurality of unlabeled training inputs;

processing each of the unlabeled training inputs in the first plurality of unlabeled training inputs using the teacher neural network and in accordance with current values of the teacher parameters to generate a respective teacher output for the machine learning task for each of the unlabeled training inputs;

generating by the teacher neural network, for each of the unlabeled training inputs, a respective pseudo-label for the unlabeled training input from the respective teacher output for the unlabeled training input;

training the student neural network to determine updated values of the student parameters from current values of the student parameters by optimizing a student objective function that measures, for each of the unlabeled training inputs in the first plurality of unlabeled training inputs, an error between (i) a respective student output for the unlabeled training input generated by processing the unlabeled training input using the student neural network in accordance with the current values of the student parameters and (ii) the respective pseudo-label for the unlabeled training input, wherein each teacher and student output for the machine learning task specifies a respective probability distribution over a plurality of classes and wherein generating, for each of the unlabeled training inputs, the respective pseudo-label for the unlabeled training input comprises:

selecting one of the classes using the probability distribution specified by the teacher output; and generating a pseudo-label that identifies the selected class as the ground-truth output for the unlabeled training input;

obtaining a first plurality of labeled training inputs and, for each labeled training input in the first plurality of labeled training inputs, a respective ground truth output for the machine learning task; and training the teacher neural network to determine updated values of the teacher parameters using student outputs generated by the student neural network for the labeled training inputs, wherein training the teacher neural network comprises optimizing a teacher objective function that includes a first term that measures, for each of the labeled training inputs in the first plurality of labeled training inputs, an error between (i) a respective student output for the labeled training input generated by processing the labeled training input using the student neural network in accordance with the updated values of the student parameters and (ii) the respective ground truth output for the labeled training input, and wherein optimizing the teacher objective comprises an approximate gradient of the first term of the teacher objective function with respect to the teacher parameters.

15. The system of claim 14, wherein the teacher objective function also includes a supervised learning term that measures, for each labeled training input in a second plurality of labeled training inputs, an error between (i) a respective teacher output for the labeled training input generated by processing the labeled training input using the teacher neural network in accordance with the current values of the teacher parameters and (ii) a respective ground truth output for the labeled training input.

16. The system of claim 14, wherein the teacher objective function also includes a semi-supervised learning term that measures, for a second plurality of unlabeled training inputs, a performance of the teacher neural network in accordance with the current values of the teacher parameters on a semi-supervised learning task as measured on the second plurality of unlabeled training inputs.

17. The system of claim 14, wherein, for each of the unlabeled training inputs, the respective pseudo-label for the unlabeled training input is the same as the respective teacher output for the unlabeled training input.

18. The system of claim 14, wherein selecting one of the classes using the probability distribution specified by the teacher output comprises:

sampling one of the classes from the probability distribution specified by the teacher output.

19. The system of claim 14, wherein computing an approximate gradient of the first term of the teacher objective function comprises:

computing a first student gradient with respect to the student parameters of the student objective function evaluated at the current values of the student parameters and for the first plurality of unlabeled training inputs;

computing a second student gradient with respect to the student parameters of the first term of the teacher objective function evaluated at the updated values of the student parameters and for the first plurality of labeled training inputs;

computing a teacher gradient with respect to the teacher parameters of a second objective that measures, for each of the first plurality of unlabeled training inputs, an error between (i) the respective pseudo-label for the unlabeled training input and (ii) the respective teacher output for the unlabeled training input generated by the teacher neural network in accordance with the current values of the teacher parameters; and computing the approximation from the first student gradient, the second student gradient, and the teacher gradient.

20. The system of claim 19, wherein computing the approximation from the first student gradient, the second student gradient, and the teacher gradient comprises:

determining a feedback coefficient from the first and second student gradients; and multiplying the teacher gradient by the feedback coefficient.

\* \* \* \* \*